(12) United States Patent
Ouyang et al.

(10) Patent No.: US 10,120,265 B2
(45) Date of Patent: Nov. 6, 2018

(54) PHOTONIC CRYSTAL ALL-OPTICAL MULTISTEP-DELAY OR-TRANSFORMATION LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 0 days.

(21) Appl. No.: 15/626,261

(22) Filed: Jun. 19, 2017

(65) Prior Publication Data

US 2017/0293203 A1  Oct. 12, 2017

Related U.S. Application Data

(63) Continuation of application No. PCT/CN2015/097841, filed on Dec. 18, 2015.

(30) Foreign Application Priority Data

Dec. 19, 2014  (CN) .......................... 2014 1 0804838

(51) Int. Cl.
*G02F 3/00* (2006.01)

(52) U.S. Cl.
CPC ............ *G02F 3/00* (2013.01); *G02F 2201/06* (2013.01); *G02F 2202/32* (2013.01)

(58) Field of Classification Search
CPC .................. G02B 6/1225; G02B 6/125; G02B 2006/1213; G02F 1/365; G02F 3/00; B82Y 20/00
USPC ...... 359/108, 243, 244; 385/17, 31; 398/141
See application file for complete search history.

(56) References Cited

U.S. PATENT DOCUMENTS

| 7,409,131 B2* | 8/2008 | Covey ..................... G02F 3/024 359/108 |
| 7,480,319 B2* | 1/2009 | Scherer ................. G02F 1/0126 359/108 |
| 2006/0062507 A1 | 3/2006 | Yanik et al. |

FOREIGN PATENT DOCUMENTS

CN           102226862 A         10/2011

OTHER PUBLICATIONS

2nd Office Action of counterpart Chinese Patent Application No. 201410804838.6 dated Mar. 16, 2017.

* cited by examiner

*Primary Examiner* — Collin X Beatty

(57) ABSTRACT

A PhC all-optical multistep-delay OR-transformation logic gate includes an optical switch unit having a first intermediate-signal output port, a PhC structure unit having a first intermediate-signal input port connected with the first intermediate-signal output port, a reference-light source connected with the reference-light input port of the optical switch unit, a wave absorbing load, a flip-flop unit, and a memory or delayer having an input port connected with a first logic signal and an output port connected with the delay-signal input port of an optical switch unit whose logic-signal input port is connected with a second logic signal; a second intermediate-signal input port of the PhC structure unit is connected with the second intermediate-signal output port of said optical switch unit; a third intermediate-signal output port of the optical switch unit is connected with the wave absorbing load; a clock control-signal is input through the input port of a two-branch waveguide.

10 Claims, 4 Drawing Sheets

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |

FIG. 4

PHOTONIC CRYSTAL ALL-OPTICAL MULTISTEP-DELAY OR-TRANSFORMATION LOGIC GATE

CROSS-REFERENCE TO RELATED APPLICATION

This application is a continuation application of PCT Application No. PCT/CN2015/097841 filed on Dec. 18, 2015, which claims priority to Chinese Patent Application No. 201410804838.6 filed on Dec. 19, 2014, the entire contents of which are hereby incorporated by reference.

FIELD OF THE INVENTION

The present invention relates to two-dimensional—(2D-) photonic crystal (PhC) optical multistep-delay OR-transformation logic gates.

BACKGROUND OF THE INVENTION

In 1987, the concept of PhC was proposed separately by E. Yablonovitch from United States Bell Labs who discussed how to suppress spontaneous radiation and by S. John from Princeton University who made discussions about photonic localization. A PhC is a material structure in which dielectric materials are arranged periodically in space, and is usually an artificial crystal including two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhC and devices thereof have continually and rapidly marched towards all-optical processing, and PhC has become a breakthrough for photonic integration. In December 1999. PhC was recognized by the American influential magazine *Science* as one of the top-ten scientific advances in 1999, and therefore has become a hot topic in today's scientific research field.

An all-optical logic device mainly includes an optical amplifier-based logic device, a non-linear loop mirror logic device, a Sagnac interference type logic device, a ring cavity logic device, a multi-mode interference logic device, an optical waveguide coupled logic device, a photoisomerized logic device, a polarization switch optical logic device, a transmission grating optical logic device, etc. These optical logic devices have the common shortcoming of large size in developing large-scale integrated optical circuits. With the improvement of science and technology in recent years, people have also done research and developed quantum optical logic devices, nano material optical logic devices and PhC optical logic devices, which all conform to the dimensional requirement of large-scale photonic integrated optical circuits. For modern manufacturing processes, however, the quantum optical logic devices and the nano material optical logic devices are very difficult to be manufactured, whereas the PhC optical logic devices have competitive advantages in terms of manufacturing process.

In recent years, PhC logic devices have become a hot area of research drawing widespread attentions, and it is highly likely for them to replace the current widely-applied electronic logic devices in the near future. The PhC logic device can directly realize all-optical logical functions, such as "AND", "OR", "NOT" and the like, and is a core device for realizing all-optical computing. In the process of realizing all-optical computing. PhC logical function devices based on "AND", "OR", "NOT", "XOR" and the like have been successfully designed and researched, and various complex logic components are still needed for achieving the goal of all-optical computing.

SUMMARY OF THE INVENTION

The present invention is aimed at overcoming the defects of the prior art and providing a PhC all-optical multi-step delay OR-transformation logic gate which is compact in structure, strong in anti-interference capability and easy to integrate with other optical logic elements.

The technical proposal adopted by the invention to solve the technical problem is as follows:

The PhC all-optical multi-step delay OR-transformation logic gate of the present invention includes an optical switch unit 01, a PhC structure unit 02, a reference-light source 03, a wave absorbing load 04, a D-type flip-flop unit 05 and a memory or delayer 06; an input port of a memory or delayer is connected with a first logic-signal $X_1$, and the output port of the memory or delayer is connected with the delay-signal input port of an optical switch unit; a logic-signal input port of said optical switch unit is connected with a second logic-signal $X_2$; said reference-light source is connected with the reference-light input port of the optical switch unit; a first intermediate-signal input port of said PhC structure unit is connected with the first intermediate-signal output port of said optical switch unit; the second intermediate-signal input port of the PhC structure unit is connected with the second intermediate-signal output port of said optical switch unit; and the third intermediate-signal output port of said optical switch unit is connected with the wave absorbing load; a clock control-signal CP is input through the input port of a two-branch waveguide, one port of a two-branch waveguide is connected with a clock-signal CP input port of said optical switch unit, and another port of a two-branch waveguide is connected with said clock-signal input port of the D-type flip-flop unit; the D-signal input port of said D-type flip-flop unit is connected with the signal-output port of said PhC structure unit.

The optical switch unit is a 3×3 optical selector switch, and includes a clock-signal CP input port, two signal-input ports, a reference-light input port and three intermediate-signal output ports; and the two signal-input ports are respectively delay-signal input port and logic-signal input port, and said three intermediate-signal output ports are respectively the first intermediate-signal output port, the second intermediate-signal output port and the third intermediate-signal output port.

The PhC structure unit 02 is a 2D-PhC cross-waveguide nonlinear cavity and is a 2D-PhC cross intersected waveguide four-port network formed by high-refractive-index, the four-port network has a four-port PhC structure, a left port is said first intermediate-signal input port, a lower port is said second intermediate-signal input port, an upper port is a signal-output port, and a right port is an idle port; two mutually-orthogonal quasi-one-dimensional (1D) PhC structures are placed in two waveguide directions crossed at a center of said cross waveguide, a dielectric pillar is arranged in a middle of the cross waveguide, the dielectric pillar is made of a nonlinear material, and a cross section of the dielectric pillar is square, polygonal, circular or oval; and the dielectric constant of a rectangular linear pillar clinging to the central nonlinear pillar and close to the signal-output port is equal to that of the central nonlinear pillar under low-light-power conditions; and said quasi-1D PhC structures and said dielectric pillar constitute a waveguide defect cavity.

The D-type flip-flop unit includes a clock-signal input port, a D-signal input port and a system output port; an input signal at the D-signal input port of the D-type flip-flop unit is equal to the output signal of said output port of said PhC structure unit.

The memory includes an input port and an output port; and said output signal of the memory is the input signal input into the memory before the k step; the delayer includes an input port and an output port; and said output signal of the delayer has k-step delay relative to the input signal thereof.

The memory or delayer is the one of k-step delay.

The 2D PhC is of a (2k+1)×(2k+1) structure, where k is an integer more than or equal to 3.

The cross section of the high-refractive-index dielectric pillar of the 2D PhC is circular, oval, triangular or polygonal.

A background filling material for the 2D PhC is air or a different low-refractive-index medium with a refractive index less than 1.4.

The refractive index of said dielectric pillar in the quasi-1D PhC of said cross waveguide is 3.4 or a different value more than 2, and the cross section of said dielectric pillar in the quasi-1D PhC is rectangular, polygonal, circular or oval.

Compared with the prior art, the present invention has the following advantages:

1. Compact in structure, and ease of manufacture;
2. Strong anti-interference capability, and ease of integration with other optical logic elements; and
3. High contrast of high and low logic outputs, and fast operation.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, indications are: first logic-signal $X_1$, second logic-signal $X_2$, optical switch unit 01, delay-signal input port 11, logic-signal input port 12, reference-light input port 13, first intermediate-signal output port 14, second intermediate-signal output port 15, third intermediate-signal output port 16, PhC structure unit 02, first intermediate-signal input port 21, second intermediate-signal input port 22, idle port 23, signal-output port 24, circular high-refractive-index linear-dielectric pillar 25, first rectangular high-refractive-index linear-dielectric pillar 26, second rectangular high-refractive-index linear-dielectric pillar 27, central nonlinear-dielectric pillar 28, reference-light source 03, reference-light E, wave absorbing load 04, clock control-signal CP, D-type flip-flop unit 05, clock-signal input port 51, D-signal input port 52, system output port 53, and memory or delayer 06.

FIG. 4 is a truth table of the logic functions of a 2D-PhC cross-waveguide nonlinear cavity shown in FIG. 1.

The present invention is more specifically described in the following paragraphs by reference to the drawings attached only by way of example.

DETAILED DESCRIPTION OF THE EMBODIMENTS

The terms a or an, as used herein, are defined as one or more than one, The term plurality, as used herein, is defined as two or more than two. The term another, as used herein, is defined as at least a second or more.

Figure 1:
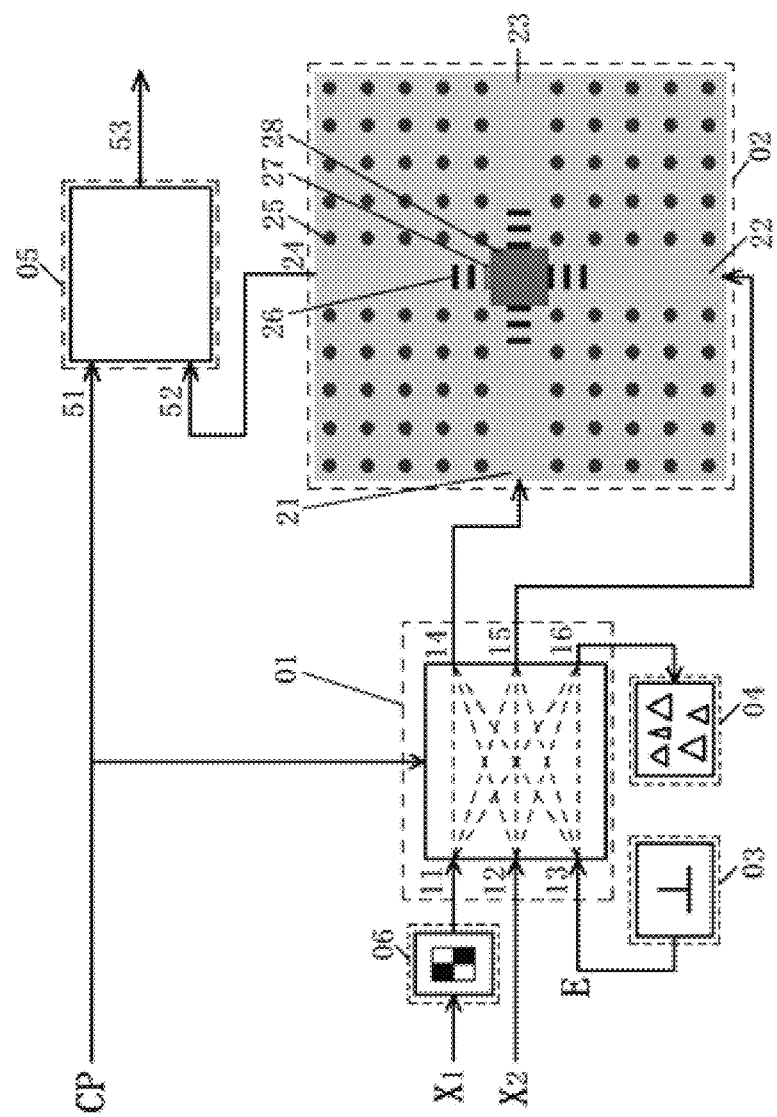
FIG. 1 is a structural schematic diagram of a PhC all-optical multistep-delay OR-transformation logic gate of the present invention.

As shown in FIG. 1, the PhC all-optical multi-step delay OR-transformation logic gate of the present invention includes an optical switch unit 01, a PhC structure unit 02, a reference-light source 03, wave absorbing load 04, a D-type flip-flop unit 05 and a memory or delayer 06; the optical switch unit 01 is a 3×3 optical selector switch controlled by a clock-signal CP, used for controlling and selecting a logic signal for outputting, and the clock-signal CP controls three input port signals for selective output as the logic input of next stage of PhC structural unit; the optical switch unit 01 includes a clock-signal CP input port, two signal-input port, a reference-light input port and three intermediate-signal output ports; and the two signal-input ports are respectively delay-signal input port and logic-signal input port, and the three intermediate-signal output ports are respectively a first intermediate-signal output port, a second intermediate-signal output port and a third intermediate-signal output port, the second logic-signal $X_2$ is connected with the logic-signal input port of the optical switch unit; the reference-light E output by the reference-light source 03 is connected with the reference-light input port 13 of the optical switch unit, and the reference-light E output by the reference-light source is 1; the first intermediate-signal output port 14 of the optical switch unit is connected with the first intermediate-signal input port 21 of the PhC structure unit 02, the second intermediate-signal output port 15 of the optical selector switch is connected with the second intermediate-signal input port 22 of the PhC structure unit 02, and the third intermediate-signal output port 16 of the optical switch unit is connected with the wave absorbing load 04; the wave absorbing load is used for absorbing light wave entering it; the memory 06 includes an input port and an output port; the output signal of the memory 06 is the input signal input into the memory before the k step; the delayer 04 includes an input port and an output port; the first logic-signal $X_1$ is connected with the input port of the memory 06, the memory outputs the logic-signal $X_1(n-k)$ of k-step delay to the delay-signal input port 11 of the optical selector switch, the memory or delayer is the one of k-step delay, the memory is arranged between the delay-signal input port of the system and the optical switch unit, the memory is the one of k-step delay is used for storing and outputting an input signal input to the memory before k steps (the memory 06 stores and outputs the logic-signal $X_1(n-k)$ before k steps of the input signal $X_1$); the output signal of the memory 06 is an input signal input to the memory before k steps; the delayer is used for performing k steps of delay on the input signal, and the output signal of the delayer has k-step delay relative to the input signal thereof; a clock control-signal CP is input through the input port of a two-branch waveguide, one port of the two-branch waveguide is connected with the clock-signal CP input port of the optical switch unit 01, and another port of the two-branch waveguide is connected with the clock-signal input port 51 of the D-type flip-flop unit 05; the D-type flip-flop unit 05 includes a clock-signal input port, a D-signal input port and a system output port; the D-signal input port 52 of the D-type flip-flop unit 05 is connected with the signal-output port 24 of the PhC structure unit 02, i.e., the input signal of the D-signal input port 52 of the D-type flip-flop unit 05 is equal to the output signal of the output port of the PhC structure unit; D-type flip-flop unit 05 takes the output signal of the output port of a PhC structural unit 02 as an input signal D; the system-signal output port 53 of the D-type flip-flop unit 05 is the system output port of the PhC all-optical multi-step delay OR-transformation logic gate of the present invention; the PhC structure unit 02 is a 2D-PhC cross-waveguide nonlinear cavity and is arranged behind the optical switch unit, the background filling material for the 2D PhC is air or a different low-refractive-index medium with a refractive index less than 1.4, the cross section of the high-refractive-index dielectric pillar of the 2D PhC is circular, oval, triangular or polygonal, and the cross section of the high-refractive-index dielectric pillar of the 2D PhC is circular, oval, triangular or polygonal; the 2D-PhC cross-waveguide nonlinear cavity is a 2D-PhC cross-waveguide four-port network formed by high-refractive-index dielectric pillars, the four-port network has a four-port PhC structure, the left port is a first intermediate-signal input port, the lower port is a second intermediate-signal input port, the upper port is a signal-output port, and the right port is an idle port; two mutually-orthogonal quasi-1DPhC structures are placed in two waveguide directions crossed at the center of across waveguide, the cross section of the dielectric pillar in the quasi-1DPhC is rectangular, polygonal, circular or oval, the cross section of the dielectric pillar in the quasi-1DPhC is rectangular, polygonal, circular or oval; the refractive index of the dielectric pillar is 3.4 or a different value more than 2, a dielectric pillar is arranged in the middle of the cross waveguide, the dielectric pillar is made of a nonlinear material, and the cross section of the dielectric pillar is square, polygonal, circular or oval, and the quasi-1DPhC structures and the dielectric pillar constitute a waveguide defect cavity. The lattice constant of the 2D-PhC array is d, and the array number is 11×11; the circular high-refractive-index linear-dielectric pillar 25 is made of a silicon (Si) material, and has a refractive index of 3.4 and a radius of 0.18d; the first rectangular high-refractive-index linear-dielectric pillar 26 has a refractive index of 3.4, long sides of 0.613d and short sides of 0.162d; the second rectangular high-refractive-index linear-dielectric pillar 27 has a dielectric constant being the same as that of a nonlinear-dielectric pillar under low-light-power conditions, and has a dimension equal to that of the first rectangular high-refractive-index linear-dielectric pillar 26; and the central square nonlinear-dielectric pillar 28 is made of a Kerr type nonlinear material, and has a side length of 1.5d, a dielectric constant of 7.9 under low-light-power conditions and a third-order nonlinear coefficient of $1.33 \times 10^{-2}$ $\mu m^2/V^2$. Twelve rectangular high-refractive-index linear-dielectric pillars and one square nonlinear-dielectric pillar are arranged in the center of the 2D-PhC cross-waveguide nonlinear cavity in the form of a quasi-1DPhC along longitudinal and transverse waveguide directions, the central nonlinear-dielectric pillar clings to the four adjacent rectangular linear-dielectric pillars and the distance there between is 0, every two adjacent rectangular linear-dielectric pillars are spaced 0.2668d from each other, and the dielectric constant of a rectangular linear pillar clinging to the central nonlinear pillar and close to the signal-output port is equal to that of the central nonlinear pillar under low-light-power conditions.

The present invention can realize an OR-transformation logic gate function and a multi-step-delay OR-transformation logic gate function of all-optical logic signals under the cooperation of unit devices such as the optical switch, based on the photonic bandgap (PBG) characteristic, quasi-1DPhC defect state, tunneling effect and optical Kerr nonlinear effect of the 2D-PhC cross-waveguide nonlinear cavity shown by 02 in FIG. 1. Introduced first is the basic principle of the PhC nonlinear cavity in the present invention: a 2D PhC provides a PBG with a certain bandwidth, a light wave with its wavelength falling into this bandgap can be propagated in an optical path designed inside the PhC, and the operating wavelength of the device is thus set to a certain wavelength in the PBG; the quasi-1DPhC structure arranged in the center of the cross-waveguide and the nonlinear effect of the central nonlinear dielectric pillar together provide a defect state mode, which, as the input light wave reaches a certain light intensity, shifts to the operating frequency of the system, so that the structure produces the tunneling effect and signals are output from the output port 24.

Figure 2:
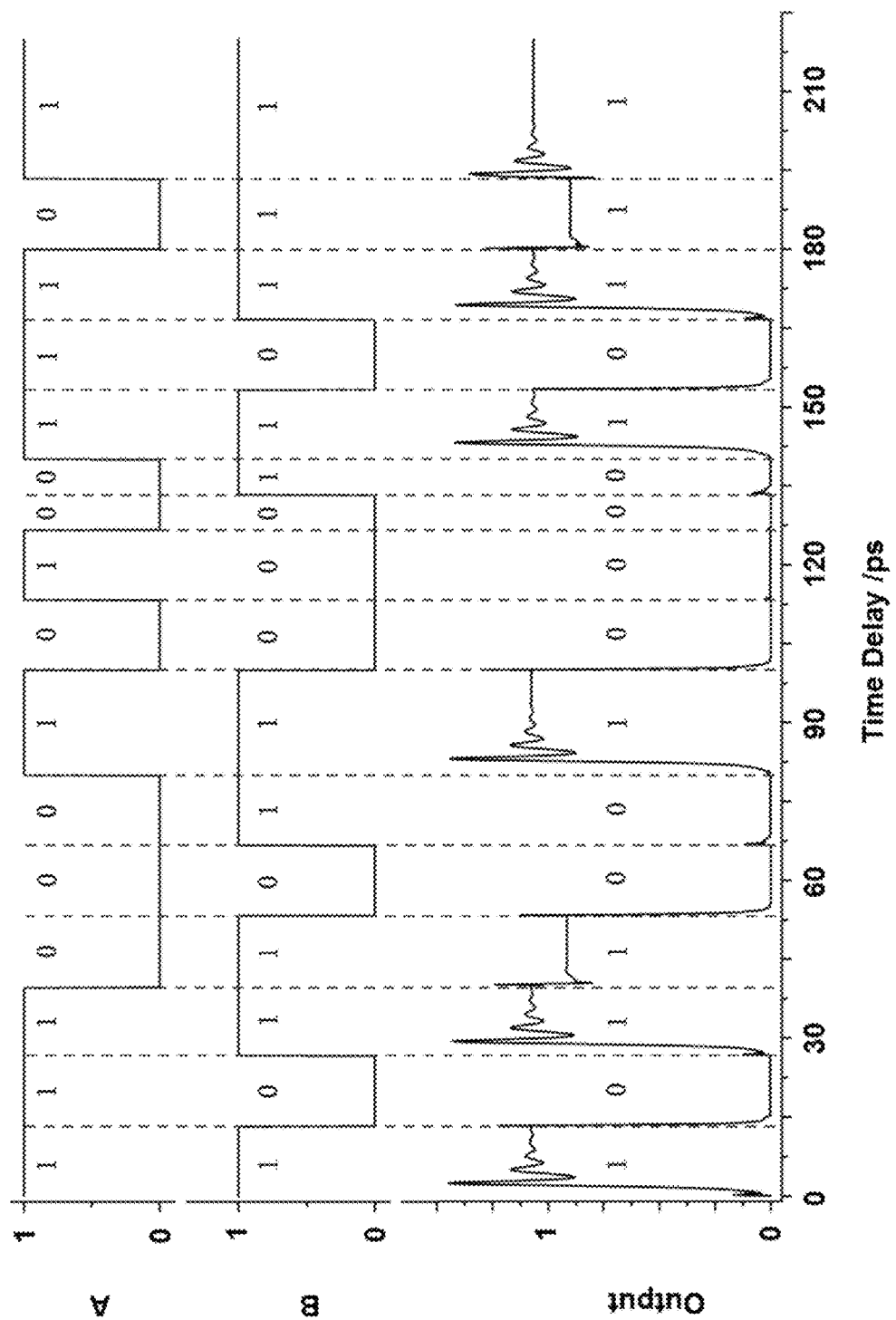
FIG. 2 is a waveform diagram of the basic logic functions of a PhC structure unit shown in FIG. 1 for the lattice constant d of 1 μm and the operating wavelength of 2.976 μm.
Figure 4:
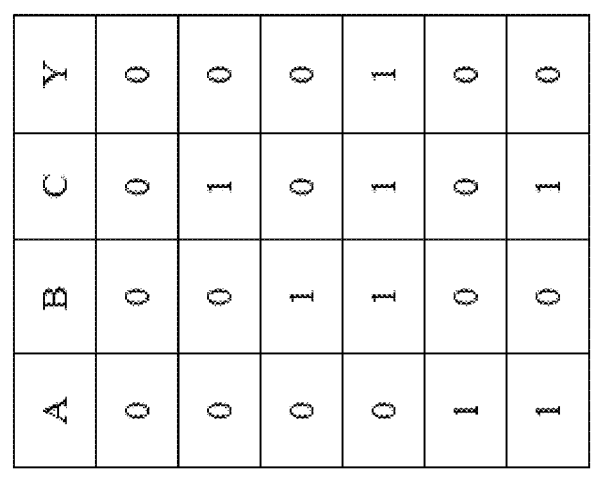

For the lattice constant d of 1 µm and the operating wavelength of 2.976 µm, referring to the 2D-PhC cross-waveguide nonlinear cavity shown by PhC structure unit 02 of FIG. 1, and for a signal A input from the port 21 and a signal B input from the port 22 indicated respectively by the upper two diagrams in FIG. 2, the logic output waveform diagram of the 2D-PhC cross-waveguide nonlinear cavity of the present invention, and the logic output waveforms at the signal-output port 24 can be obtained, as shown by the signal waveforms in the lower diagram in FIG. 2. A logic operation truth table shown in FIG. 4 can be obtained according to the logic operation characteristic shown in FIG. 2. In FIG. 4, C is the output at the output port 24 of the PhC structure unit 02—the current state $Q^n$, and Y is signal output at the output port 24 of the PhC structure unit 02—the next state $Q^{n+1}$. A logic expression of the PhC structure unit 02 can be obtained according to the truth table.

$$Y = AB + BC \quad (1)$$

That is $$Q^{n+1} = AB + BQ^n \quad (2)$$

According to the basic logic operation characteristic of the above 2D-PhC cross-waveguide nonlinear cavity, the logic output of the previous step serves as a logic input to the structure itself to realize logic functions.

As shown in FIG. 1, for CP=0, the optical selector switch turns the delay-signal $X_1(n-k)$ at the delay-signal input port 11 to the second intermediate-signal output port 15 of the optical selector switch (note: $X_i(n)$ is a simplified form of $X_i(t_n)$ where i is 1 or 2, $t_n$ is time, and n can be any integer), and the delay-signal $X_1(n-k)$ is further projected to the second intermediate-signal input port 22 of the PhC structure unit 02, i.e., the input signal of the second intermediate-signal input port 22 of the PhC structure unit 02 is equal to the delay-signal $X_1(n-k)$ of the delay-signal input port 11; simultaneously, the optical selector switch turns the reference-light E at the reference-light input port 13 to the first intermediate-signal output port 14 of the optical selector switch, and the reference-light E is further projected to the first intermediate-signal input port 21 of the PhC structure unit 02, i.e., the input signal of the first intermediate-signal input port 21 of the PhC structure unit 02 is equal to the reference-light E (E=1) of the reference-light input port 13; and simultaneously, the optical selector switch turns the logic-signal $X_2$ at the logic-signal input port 12 to the third intermediate-signal output port 16 of the optical switch unit, and the logic-signal $X_2$ is further projected to the wave absorbing load 04.

For CP=1, the optical selector switch turns the delay-signal $X_1(n-k)$ at the delay-signal input port 11 to the third intermediate-signal output port 16 of the optical switch unit, and the delay-signal $X_1(n-k)$ is projected to the wave absorbing load 04; simultaneously, the optical selector switch turns the logic-signal $X_2$ at the logic-signal input port 12 to the first intermediate-signal output port 14 of the optical selector switch, and the logic-signal $X_2$ is further projected to the first intermediate-signal input port 21 of the PhC structure unit 02, i.e., the input signal of the first intermediate-signal input port 21 of the PhC structure unit 02 is equal to the logic-signal $X_2$ of the logic-signal input port 12; and simultaneously, the optical selector switch turns the reference-light E of the reference-light input port 13 to the second intermediate-signal output port 15 of the optical selector switch, and the reference-light E is further projected to the second intermediate-signal input port 22 of the PhC structure unit 02, i.e., the input signal of the second intermediate-signal input port 22 of the PhC structure unit 02 is equal to the reference-light E of the reference-light input port 13.

With the cooperation described above, the multi-step delay "OR" transformation logic function of all-optical logic signals can be realized.

The PhC structure of the device in the present invention can be of a (2k+1)×(2k+1) array structure, where k is an integer more than or equal to 3. Design and simulation results will be provided below in an embodiment given in combination with the accompanying drawings, wherein the embodiment is exemplified by an 11×11 array structure and a lattice constant d of 1 μm.

At a moment $t_n$, CP is made equal to 0, the optical selector switch transmits the delay-signal $X_1(n-k)$ of the delay-signal input port 11 to the second intermediate-signal output port 15, and the delay-signal $X_1(n-k)$ is further projected to the second intermediate-signal input port 22 of the PhC structure unit 02; the optical selector switch transmits the reference-light E of the reference-light input port 13 to the first intermediate-signal output port 14, and the reference-light E is further projected to the first intermediate-signal input port 21 of the PhC structure unit 02; and the optical selector switch transmits the signal $X_2(n)$ of the logic-signal input port 12 to the third intermediate-signal output port 16, and the signal $X_2(n)$ is further projected to the wave absorbing load 04. The output of the port 24 at this moment can be obtained from the expression (2):

$$Q^{=n+1}=X_1(n-k) \quad (3)$$

At a moment $t_{n+1}$, CP is made equal to 1, the optical selector switch transmits the delay-signal $X_1(n-k+1)$ of the delay-signal input port 11 to the third intermediate-signal output port 16, and the delay-signal $X_1(n-k+1)$ is further projected to the wave absorbing load 06; the optical selector switch turns the signal $X_2(n+1)$ of the logic-signal input port 12 to the first intermediate-signal output port 14, and the signal $X_2(n+1)$ is further projected to the first intermediate-signal input port 21 of the PhC structure unit 02; and simultaneously, the optical selector switch transmits the reference-light E of the reference-light input port 13 to the second intermediate-signal output port 15, and the reference-light E further is projected to the second intermediate-signal input port 22 of the PhC structure unit 02. The output of the port 24 at this moment can be obtained from the expression (2):

$$Q^{n+1}=X_2(n+1)+X_1(n-k) \quad (4)$$

The output at the output port 24 of the PhC structure unit 02 is equal to the input of the D-signal input port 52 of the D-type flip-flop unit 05, and it can be obtained from the expressions (3) and (4) that the input signal D of the D-signal input port 52 is $Q^{n+1}=X_1(n-k)$ for CP=0 and is $X_2(n+1)+X_1(n-k)$ for CP=1.

It can be known according to the logic characteristic of the D-type flip-flop that for CP=1, the system output follows with the input signal D; and for CP=0, the system output keeps the input signal D at the previous moment. Thus, it can be known that the output at the system output port 53 of the device in the present invention is $Q^{n+1}=X_2(n+1)+X_1(n)$ for CP=1; and at a next moment for CP=0, the system output keeps the output at the previous moment, i.e., the system output in a clock cycle is:

$$Q^{n+1}=X_2(n+1)+X_1(n-k) \quad (5)$$

Hence, the device in the present invention can realize the multi-step delay OR-transformation logic function of logic signals. If the memory is changed into a k-step delayer, the same function can be realized.

For the operating wavelength of 2.976 μm in the device and the lattice constant d of 1 μm for the PhC structure unit 02, the radius of the circular high-refractive-index linear-dielectric pillar 25 is 0.18 μm, the long sides of the first rectangular high-refractive-index linear-dielectric pillar 26 are 0.613 μm, the short sides are 0.162 μm, the size of the second rectangular high-refractive-index linear-dielectric pillar 27 is the same as that of the first rectangular high-refractive-index linear-dielectric pillar 26, the side length of the central square nonlinear-dielectric pillar 28 is 1.5 μm, the third-order nonlinear coefficient is $1.33 \times 10^{-2}$ μm²/V², and the distance between every two adjacent rectangular linear-dielectric pillars is 0.2668 μm. Based on the above parameters, as the delay-signal $X_1(n-k)$ at the delay-signal input port 11 of the optical selector switch and the signal $X_2(n)$ at the logic-signal port 12 are input according to the second and third waveforms shown in FIG. 3, a system-output waveform diagram at the lower part of FIG. 3 can be obtained under the control of the clock-signal CP. Hence, the system carries out OR logic operation on the logic input quantity $X_2(n+1)$ and the logic input quantity $X_1(n-k)$ of the previous moment. That is, the multi-step delay OR-transformation logic function of the two logic signals is realized.

Figure 3:
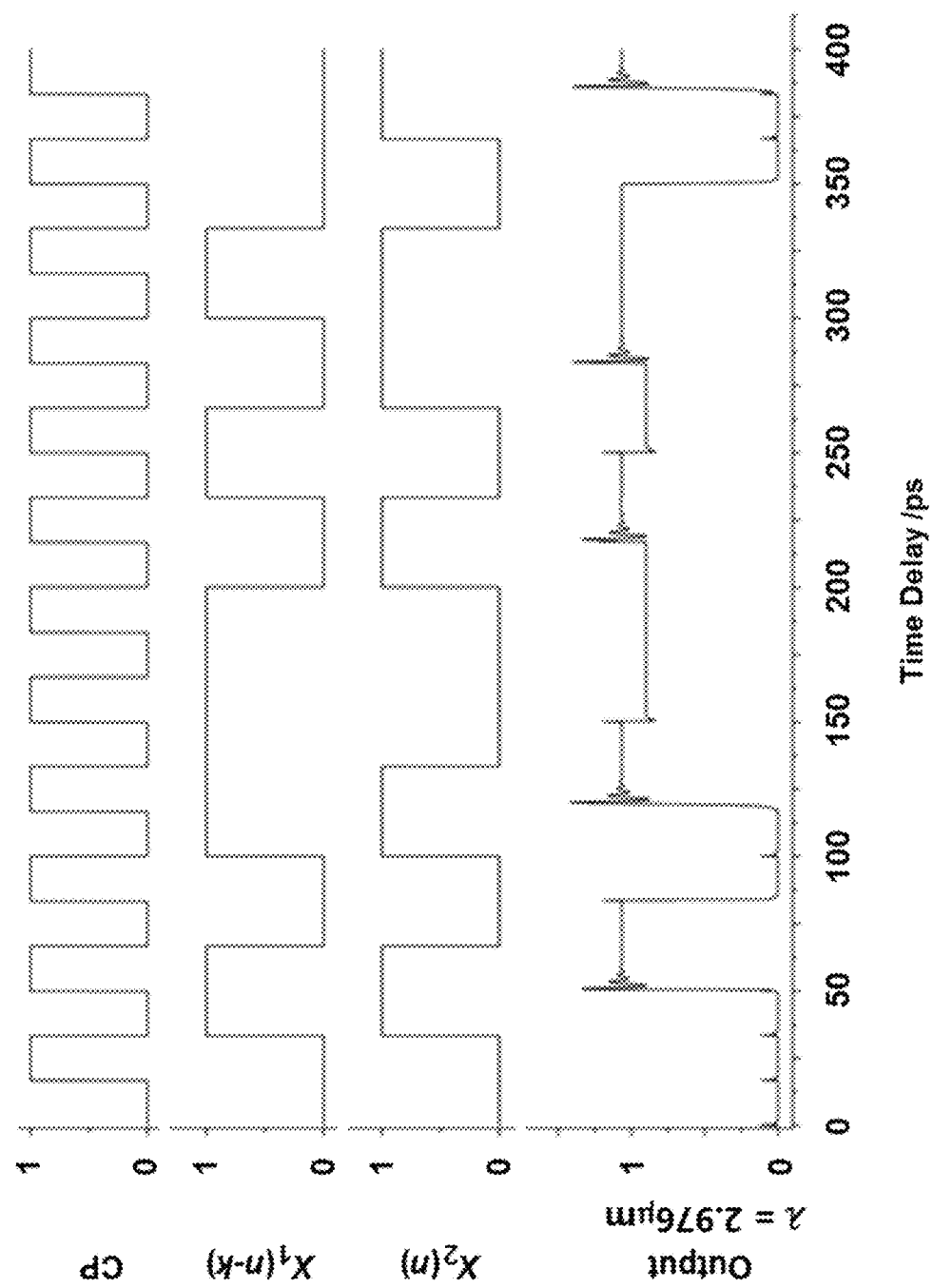
FIG. 3 is a waveform diagram for realizing the multi-step delay OR-transformation logic function of two logic signals for the lattice constant d of 1 μm and the operating wavelength of 2.976 μm.

The device in the present invention can realize the same logic function similar to that indicated in FIG. 3 under different lattice constants and corresponding operating wavelengths by scaling.

In conclusion, a multistep-delay OR-transformation logic function of two all-optical logic signals can be realized by the control of the clock-signal CP at the clock-signal input port under the coordination of relevant unit devices.

In the logic-signal processing in an integrated optical circuit, self-convolution operation of a single logic signal can be defined, and the above-mentioned OR logic operation of the two logic signals is a basic operation of the self-convolution operation of logic signals. The OR-transformation logic function of logic signals realized in the present invention plays an important role in realizing self-correlation transformation or self-convolution operation of logic variables.

While the invention has been described in terms of various specific embodiments, those skilled in the art will recognize that the invention can be practiced with modification within the spirit and scope of the claims.

What is claimed is:

1. A PhC all-optical multistep-delay OR-transformation logic gate, wherein said PhC all-optical multistep-delay OR-transformation logic gate comprising:

an optical switch unit, a PhC structure unit, a reference-light source, wave absorbing load, a D-type flip-flop unit and a memory or delayer; an input port of a memory or delayer is connected with a first logic-signal $X_1$, and the output port of the memory or delayer is connected with the delay-signal input port of an optical switch unit; a logic-signal input port of said optical switch unit is connected with a second logic-signal $X_2$; said reference-light source is connected with the reference-light input port of said optical switch unit; a first intermediate-signal input port of said PhC structure unit is connected with the first intermediate-signal output port of said optical switch unit; the second intermediate-signal input port of said PhC structure unit is connected with the second intermediate-signal output port of said optical switch unit; and the third intermediate-signal output port of said optical switch unit is connected with the wave absorbing load; a clock control-signal CP is input through the input port of a two-branch waveguide, one port of a two-branch waveguide is connected with a clock-signal CP input port of said optical switch unit, and another port of a two-branch waveguide is connected with said clock-signal input port of said D-type flip-flop unit; the D-signal input port of said D-type flip-flop unit is connected with the signal-output port of said PC structure unit.

2. The PhC all-optical multistep-delay OR-transformation logic gate according to claim 1, wherein said the optical switch unit is a 3×3 optical selector switch, and includes a clock-signal CP input port, two signal-input ports, a reference-light input port and three intermediate-signal output ports; and the two signal-input ports are respectively delay-signal input port and logic-signal input port, and said three intermediate-signal output ports are respectively the first intermediate-signal output port, the second intermediate-signal output port and the third intermediate-signal output port.

3. The PhC all-optical multistep-delay OR-transformation logic gate according to claim 1, wherein said PhC structure unit is a 2D-PhC cross-waveguide nonlinear cavity and is a 2D-PhC cross intersected waveguide four-port network formed by high-refractive-index, the four-port network has a four-port PhC structure, a left port is said first intermediate-signal input port, a lower port is said second intermediate-signal input port, an upper port is a signal-output port, and a right port is an idle port; two mutually-orthogonal quasi-one-dimensional (1D) PhC structures are placed in two waveguide directions crossed at a center of said cross waveguide, a dielectric pillar is arranged in a middle of said cross waveguide, said dielectric pillar is made of a nonlinear material, and a cross section of said dielectric pillar is square, polygonal, circular or oval; and the dielectric constant of a rectangular linear pillar clinging to the central nonlinear pillar and close to the signal-output port is equal to that of said central nonlinear pillar under low-light-power conditions; and said quasi-1DPhC structures and said dielectric pillar constitute a waveguide defect cavity.

4. The PhC all-optical multistep-delay OR-transformation logic gate according to claim 1, wherein said D-type flip-flop unit includes a clock-signal input port, a D-signal input port and a system output port; an input signal at said D-signal input port in said D-type flip-flop unit is equal to the output signal at said output port in said PhC structure unit.

5. The PhC all-optical multistep-delay OR-transformation logic gate according to claim 1, wherein said memory includes an input port and an output port; and said output signal of the memory is the input signal input into said memory before the k steps; the delayer includes an input port and an output port; and said output signal of the delayer has k-step delay relative to the input signal thereof.

6. The PhC all-optical multistep-delay OR-transformation logic gate according to claim 1, wherein said memory or delayer provides the one of k-step delay.

7. The PhC all-optical multistep-delay OR-transformation logic gate according to claim 1, wherein said 2D-PhC is of a (2k+1)×(2k+1) structure, where k is an integer more than or equal to 3.

8. The PhC all-optical multistep-delay OR-transformation logic gate according to claim 1, wherein said cross section of the high-refractive-index dielectric pillar of said 2D-PhC is circular, oval, triangular or polygonal.

9. The PhC all-optical multistep-delay OR-transformation logic gate according to claim 1, wherein a background filling material for the 2D-PhC is air or a different low-refractive-index medium with a refractive index less than 1.4.

10. The PhC all-optical multistep-delay OR-transformation logic gate according to claim 1, wherein said refractive index of said dielectric pillar in the quasi-1D PhC of said cross waveguide is 3.4 or a different value more than 2, and the cross section of said dielectric pillar in said quasi-1D PhC is rectangular, polygonal, circular or oval.

* * * * *